Nov. 20, 1962 H. L. PETERSON 3,065,423

SIMULTANEOUS HYBRID DIGITAL-ANALOG MULTIPLIER

Filed Oct. 30, 1959

2 Sheets-Sheet 1

INVENTOR
HERBERT L. PETERSON

BY Richard C. Reed

ATTORNEY

Nov. 20, 1962 H. L. PETERSON 3,065,423

SIMULTANEOUS HYBRID DIGITAL-ANALOG MULTIPLIER

Filed Oct. 30, 1959 2 Sheets-Sheet 2

*INVENTOR*
HERBERT L. PETERSON

BY Richard C Reed

*ATTORNEY*

3,065,423

SIMULTANEOUS HYBRID DIGITAL-ANALOG MULTIPLIER

Herbert L. Peterson, 5521 24th Ave., Hillcrest Heights, Md. (Washington 21, D.C.)

Filed Oct. 30, 1959, Ser. No. 849,996
6 Claims. (Cl. 235—150)
(Granted under Title 35, U.S. Code (1952), sec. 266)

The invention described herein may be manufactured and used by or for the Government of the United States of America for governmental purposes without the payment of any royalties thereon or therefor.

The present invention relates to an electronic converter for translating data supplied in binary digital code into the form of an analog current or voltage. More particularly the present disclosure relates to a simplified hybrid device which combines the accuracy of a digital computer with the speed of an analog computer for a particular computation process.

In automatic data processing equipment, it is often convenient or necessary to handle and compute data in digital form, while the output must be in the form of an analog signal. Digital computers are preferred because of their accuracy as compared to analog computers. Analog output data is usually required to operate subsequent devices, as, for example, to vary the angular position of a shaft, adjust the level of a fluid in a tank, or draw a graph.

The disadvantage of using a digital rather than an analog computer lies in the complexity and/or slower speed of the former. In multiplying two numbers together, for example, one number is generally stored and successively multiplied by each digit of the other. The results from each of these multiplications must be added. The multiplications in digital form are easily performed, but the additions must be accomplished either in serial steps with added delay for carry digits, or in a single complex step involving a much greater amount of computing equipment. It would appear that construction of a simple accurate high-speed computer presents a dilemma.

The present invention provides a means for avoiding this dilemma, at least in this one instance described above.

An object of the invention, therefore, is to provide a computer which partly combines the accuracy of a digital computer with the speed and simplicity of an analog computer by means of a novel combination of their components.

A further object of the invention is to provide a digital to analog code converter which can be used with a digital computer, and which bypasses certain time-consuming digital operations which contribute little, if any, accuracy to the resulting analog signal.

These and other objects of the invention will be better understood with reference to the following drawing wherein.

Figure 1:
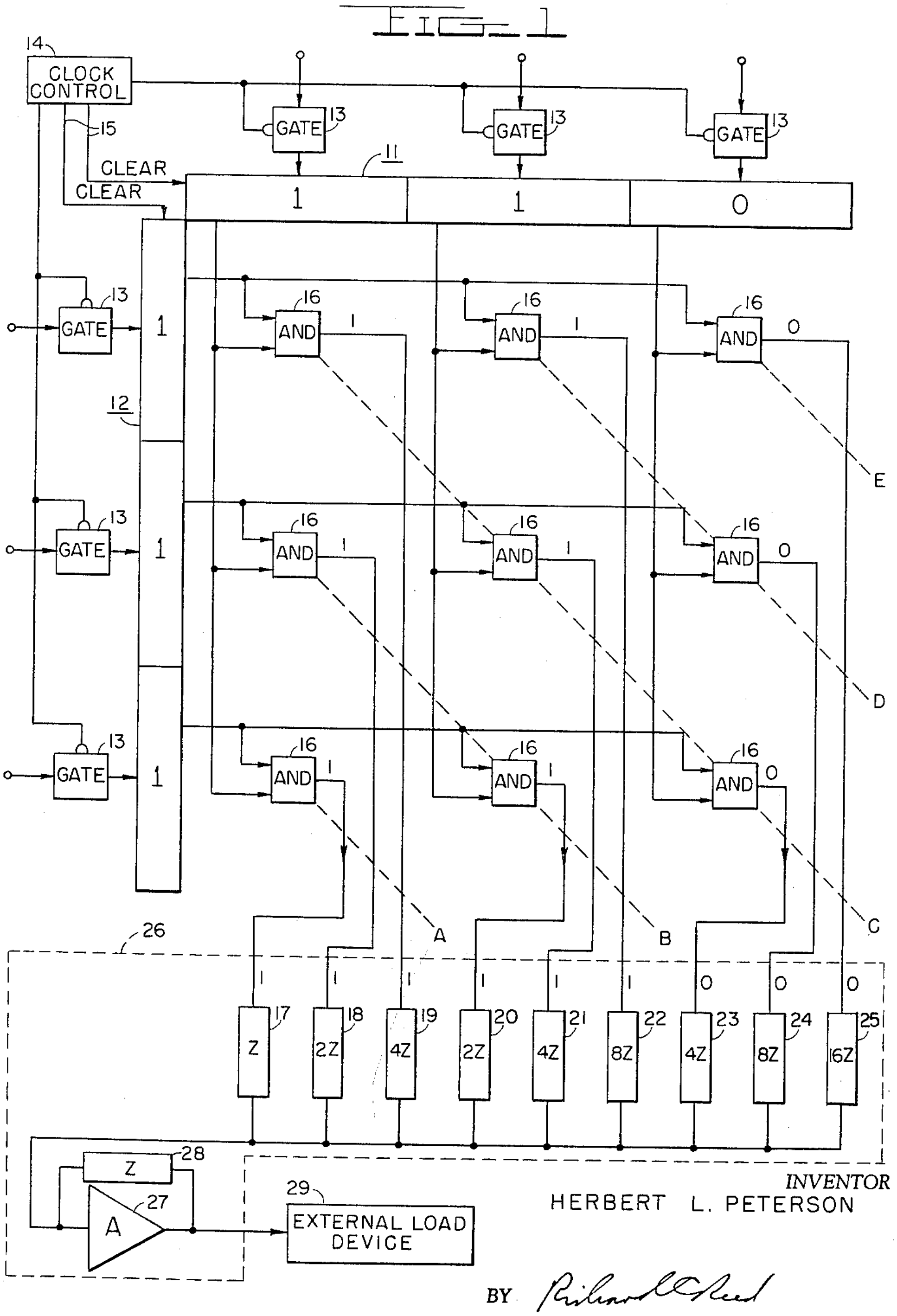
FIG. 1 shows a logical embodiment of the invention.

Referring to FIG. 1 there is shown one logical embodiment of the present invention. Data to be multiplied is supplied in the form of current pulses in binary digital code from two sources not shown. These sources may be other computers, storage devices, or a combination of the two.

In this embodiment two storage registers are provided to handle the incoming digits. The horizontal register 11 is used to store a multiplicand with the most significant digit appearing in the left hand place. The multiplier is stored in the vertical register 12 with the most significant digit at the bottom of the register. The registers comprise conventional bistable circuits well known in the art, and examples of these structures may be found either in the publication by Millman and Taub, Pulse and Digital Circuits, published in 1946 by McGraw-Hill, or the publication by R. K. Richards, Digital Computer Components and Circuits, published 1958, by Van Nostrand.

In order to best utilize the speed characteristics of the computer, values are fed into the registers in parallel fashion. To accomplish this, each place in the registers is provided with an input gate 13, the gates working in synchronism with the clock control 14. The clock control pulse generator is synchronized with the repetition rate of these pulses. Each control pulse is applied with the minimum necessary delay to the input gates and the clear inputs 15 of the register to admit all of the input digits simultaneously. The registers thus handle entire numbers at the digital repetition rate. This means that the present computer can handle information from several computers having time staggered serial read-outs.

To better understand the operation of the computer consider the conventional multiplication of the numbers shown in the registers.

```
    110=(6)
    111=(7)
    ---
    110
   110      Matrix
  110
  ------
  101010=(42)
```

The digits underlined produced carry digits which ordinarily involve delay or complexity in even this simple computation. The multiplication steps produced the staggered central matrix of digits. Consider the digits shifted to the right with the zeros aligned vertically and digits having the same significance now aligned in diagonal rows.

Each digit in the matrix now corresponds to one of the coincidence or "AND" circuits shown in FIG. 1. These circuits sense the condition of the register places which were multiplied to produce the matrix digit and produces an output pulse, for example, when pulses occur in both registers. Logically this provides the multiplication steps.

To sum the products thus produced, the output of each AND circuit is applied to one of a plurality of parallel impedances 17—25 having values weighted in accordance with the significance of each digit, as is readily determined from the dashed lines A, B, C, D and E in FIG. 1 which represent vertical rows of the staggered matrix mentioned previously. The impedances, in this instance, have values which vary by powers of 2 in accordance with the binary coding of the digits. The impedances thus act as attenuators limiting the AND circuit output currents to binary values.

The output currents from all of the coincidence circuits are then combined to obtain a current analog output signal, which is in turn applied to an external load device 29. This output corresponds to the sum of all the digital products in the matrix with the carry digits inherently added in. The weighting impedances form a part of a standard analog adder circuit 26 including an operational amplifier 27 with a feedback impedance 28 adjusted to provide the desired scale factor, time constants, etc. If a smoothly varying analog output signal is desired, the operational amplifier and/or the coincidence circuits may be provided with long time constants, in accordance with a practice well known in the art, to provide an integrating effect. It may also be desirable to choose a register wherein the digits of a stored number are not cleared except when a subsequent digit of different character occurs in the same place, to reduce transients in the analog signal. Conventional registers of this type are well known in the art and require no further discussion here.

For purposes of illustration the impedance of the coincidence circuits has been assumed to be negligible compared to the weighted impedances. If this is not so, the weighted impedances may be reduced to provide the proper current levels from the various coincidence circuits. For convenience, these impedances may be made adjustable.

Figure 2:
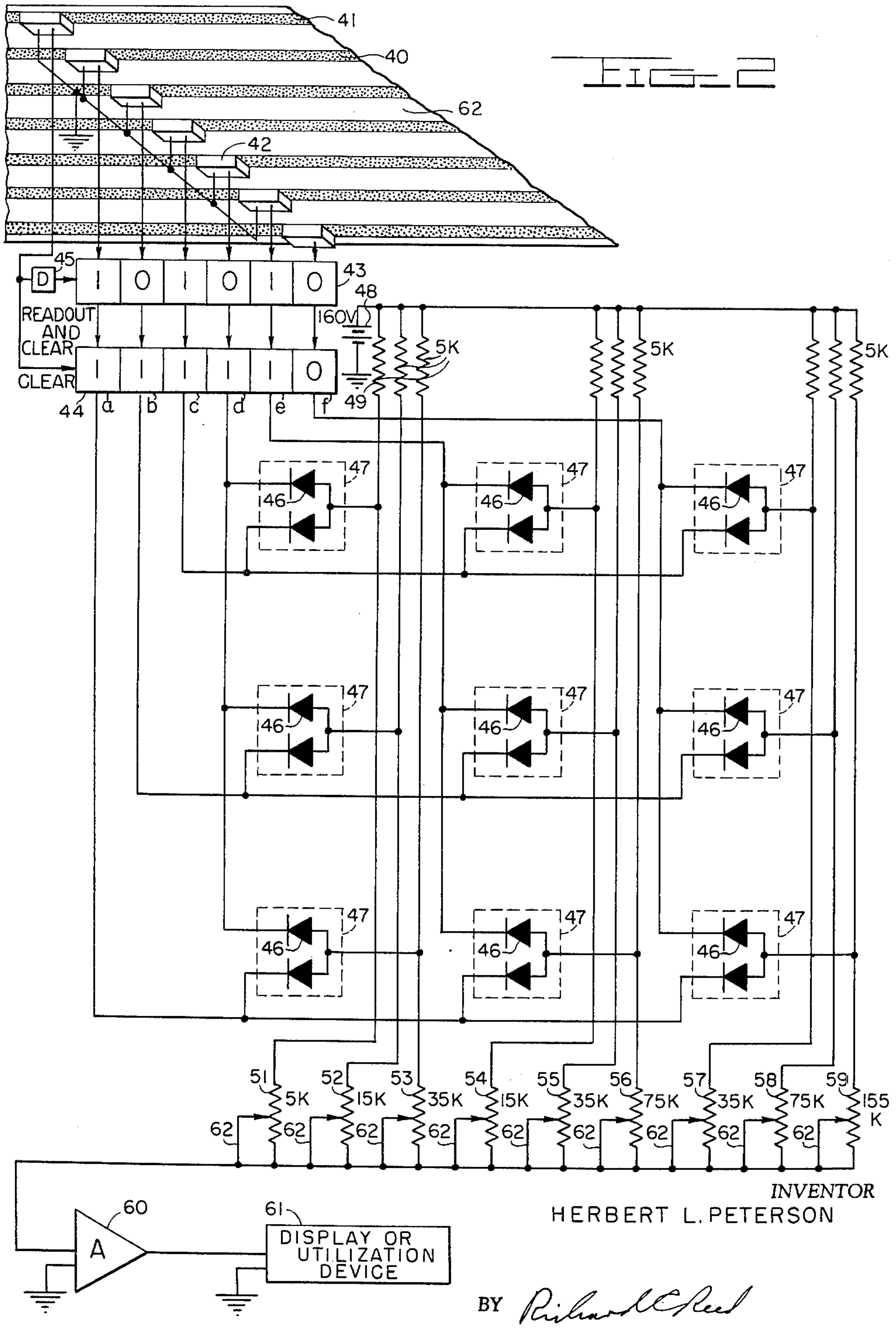
FIG. 2 shows an embodiment of the invention for computing correlation curves from data stored in digital code on magnetic tapes.

Referring to FIG. 2 there is shown a specific embodiment of the invention for use with data recorded on magnetic tape. The data consists of two three-digit binary numbers, each digit being recorded on a separate track 40 of a conventional ribbon tape 62. An extra track 41 is provided to supply timing pulses for readout purposes. Each track is provided with a reading head 42 including a preamplifier with a low impedance output (preferably a transformer coupled with a few ohms resistance in the secondary).

In some cases, the digits, which appear in successive periods between timing pulses, do not have the same relative positions in the respective tracks and consequently cannot be directly read in unison by any arrangement of the heads. An accumulator register 43 is thus provided into which digits may be inserted at any time during this period. The timing pulse from track 41 at the end of each period is applied first to a computing register 44 clearing any number appearing therein and then through a delay device 45 to the accumulator to replace the value in the computing register and to reset the accumulator for the next period.

The output pulses from the computing register, which are produced either during the reading-in or the clear function of the register have peak potentials equal to or greater than 160 v. for this particular structure. Each pulse is applied to the cathode of one diode as, for example, diode 46 of an AND circuit 47 in accordance with the matrix pattern set forth in FIG. 1. The anodes of both diodes in each AND circuit are directly connected and are rendered conducting by a source 48 of 160 v. positive through a separate load resistor 49. The anodes of each AND circuit are also connected to ground through one of the weighting resistors 51—59, which supply input current to an operational amplifier 60.

The diodes 46, which may be Hughes type 1N100, are normally conducting a current limited by load resistors 49 each of which has, for example, 5000 ohms. The few ohms of forward resistance supplied by the diodes provides negligible voltages at their anodes. If the peak potentials are applied to both cathodes simultaneously, conduction ceases and current passes instead through one of the weighting resistors.

The weighting resistors are tapered in value to provide the proper current flow. The following values have been assigned the illustrative embodiment shown:

| | Ohms |
|---|---|
| **51** | 5,000 |
| **52** | 15,000 |
| **53** | 35,000 |
| **54** | 15,000 |
| **55** | 35,000 |
| **56** | 75,000 |
| **57** | 35,000 |
| **58** | 75,000 |
| **59** | 155,000 |

The current pulses thus produced correspond in peak values to the significance of the digital product provided by each of the coincidence circuits, the most significant being 16 ma. through the first weighting resistor 51 and the least significant being 1 ma. through the largest weighting resistor 59. The adding process takes place in the operational amplifier 60 which preferably includes an integrating feedback to provide a smoothed stepped output to a display, recording or other utilization device 61.

If the period between timing pulses is long compared to the time constants of the computing register, additional data sources and accumulation registers may be coupled to the circuit of FIG. 2 in the same fashion as the one shown. The timing pulses of each must, of course, be staggered in time. Input diodes having greater forward resistance and data sources of higher output impedance may be employed by clamping the output potential of the coincidence circuits at a fixed potential under 160 v. The weighting resistors may be provided with adjustable shorting taps 62 to calibrate the circuit, if desired.

While the output of the storage registers has been described as pulses, this is not true of a majority of the circuits in present day use. Most often, the digit is represented by the presence or absence of a fixed voltage or current level in the register. This level in each place remains essentially constant until changed by a digit of unlike character in a subsequently inserted number. Similar changes occur in the matrix of AND circuits, so that the final result is a staircase output which is a closer approximation of a continuous analog function than a pulsed output. The above operation does not require as broad a frequency band of operation as do pulse circuits. Registers of this type employing double-ended transfer are ideally suited to the invention, since digits can be inserted therein without first clearing the proceeding number.

Obviously many modifications and variations of the present invention are possible in the light of the above teachings. It is therefore to be understood that within the scope of the appended claims the invention may be practiced otherwise than as specifically described.

What is claimed is:

1. A high speed digital multiplier and digital-to-analog signal converter for obtaining the product of an $m$ digit and $n$ digit binary number in analog form comprising; a multiplier having having $m$ digit inputs for a multiplier signal and $n$ digit inputs for a multiplicand signal, $n$ groups of $m$ normally closed gating circuits each having a normal input, a control input, and an output, the normal inputs in each group being connected to one another and to one of said $n$ inputs, each group being connected to a different one of said $n$ inputs, the control inputs of each group being connected to different ones of said $m$ inputs, the outputs, of said gating circuits being connected in parallel and having impedances weighted in accordance with the significance of the digits supplied thereto; a common output means serially connected with said outputs for combining the output currents from each of said outputs; and means to supply equal duration pulses corresponding to the digits of said numbers in parallel simultaneously to all of said inputs.

2. The multiplier and converter according to claim 1 wherein said means to supply equal duration pulses includes a recorder with $m$ plus $n$ reading heads.

3. A high speed digital multiplier and converter according to claim 1 wherein said common output means includes an operational amplifier and display means connected to the output of said amplifier to record the output signal therefrom.

4. A high speed digital multiplier and converter according to claim 3 wherein said operational amplifier includes an integrating feedback circuit for smoothing the output waveform.

5. The mutliplier and converter according to claim 3 wherein said means to supply equal duration pulses includes a recorder with $m$ plus $n$ reading heads.

6. The multiplier and converter according to claim 4 wherein said means to supply equal duration pulses includes a recorder with $m+n$ reading heads.

References Cited in the file of this patent

UNITED STATES PATENTS

| | | |
|---|---|---|
| 2,428,812 | Rajchman | Oct. 14, 1947 |
| 2,869,784 | Thomas | Jan. 20, 1959 |
| 2,891,237 | Sink et al. | June 16, 1959 |
| 2,910,237 | Meyer et al. | Oct. 27, 1959 |
| 2,954,928 | Davey | Oct. 4, 1960 |

FOREIGN PATENTS

| | | |
|---|---|---|
| 1,101,201 | France | Apr. 20, 1955 |
| 1,182,936 | France | Jan. 19, 1959 |